United States Patent [19]

Face

[11] Patent Number: 5,535,143
[45] Date of Patent: Jul. 9, 1996

[54] ROLLING DIGITAL SURFACE MEASUREMENT APPARATUS

[76] Inventor: Allen Face, 14 James Landing Rd., Newport News, Va. 23606

[21] Appl. No.: 166,861

[22] Filed: Dec. 15, 1993

[51] Int. Cl.$^6$ ........................................... G01B 5/20
[52] U.S. Cl. ................ 364/560; 364/561; 364/562; 73/104; 73/105; 33/523; 33/551; 33/552; 33/553; 33/554
[58] Field of Search .................. 33/523, 523.1, 33/523.2, 551, 552, 553, 554; 73/105, 104; 364/560, 561, 562

[56] References Cited

U.S. PATENT DOCUMENTS 2,335,390  11/1943  Crist .
3,026,164   3/1962  Lancerini .
3,056,209  10/1962  Oliver .
4,048,849   9/1977  Gocho et al. ............................ 73/105
4,084,324   4/1978  Whitehouse ........................ 33/174 L
4,403,419   9/1983  Graves ................................ 33/174 P
4,434,558   4/1984  Face, Jr. ............................. 33/174 P
4,473,960  10/1984  Face, Jr. ................................ 33/366

Primary Examiner—Edward R. Cosimano
Assistant Examiner—Kamini S. Shah
Attorney, Agent, or Firm—Peter J. Van Bergen

[57] ABSTRACT

A rolling digital surface measurement apparatus which measures and records the second elevation differences between a plurality of sequentially oriented, regularly spaced, co-linear points which lie on the surface, and which then computes the elevations of those points relative to a datum line established relative to any two points in the sequence by assuming that the mean curvatures of the tested surface are equal to zero in order to remove the inevitable effects of error compounding.

3 Claims, 4 Drawing Sheets

ROLLING DIGITAL SURFACE MEASUREMENT APPARATUS

BACKGROUND OF THE INVENTION

1. Field of the Invention

The present invention generally relates to a surface measurement apparatus and more specifically to a rolling digital surface measurement apparatus which measures and records the second elevation differences between a plurality of sequentially oriented, regularly spaced, co-linear points which lie on the surface being measured, and which then computes the elevations of the sequential points relative to a datum line established relative to any two points in the sequence by assuming that the mean curvatures of the tested surface are equal to zero in order to remove the inevitable effects of error compounding.

2. Description of the Prior Art

Various efforts have been made and a number of patents granted relating to the measurement of the profile or contour of a surface such as floor surfaces, roadway surfaces and the like. The following U.S. Pat. Nos. relate to this subject matter.

U.S. Pat. No. 2,335,390
U.S. Pat. No. 3,026,164
U.S. Pat. No. 3,056,209
U.S. Pat. No. 4,048,849
U.S. Pat. No. 4,084,324
U.S. Pat. No. 4,403,419
U.S. Pat. No. 4,434,558
U.S. Pat. No. 4,473,960

Prior U.S. Pat. No. 3,056,209 issued to Robert E. Oliver on Oct. 2, 1962 discloses a three wheel, continuous recording, analog computation device that endeavors to accurately measure the contours of a surface with respect to a reference plane by the use of a "floating" center wheel which produces a vertical displacement signal with respect to the distance travelled over the surface by a double integration procedure. Equations 1 through 4 in the Oliver patent describe the geometrical/mathematical relationships between the measured and desired quantities that make such a device theoretically possible. However, the patentee notes that it is necessary to consider stability problems and proceeds to change the ideal coefficients given in Equation 4 to certain values which the patentee found, through experience, to yield satisfactory results. The patentee justifies the abandonment of the ideal mathematical model as necessary to overcome serious problems of noise compounding that is inherent in all such integration devices (see column 5 of the Oliver patent). The patentee subsequently explains that the practical effect of changing the coefficients will be to damp out oscillations caused by noise signals and lists seven different pairs of alternative K2 and K3 values that were found useful. Apparently, the particular coefficient pair to be used will depend upon the wavelengths present in the surface being tested because changing the K2 and K3 coefficients effectively blinds the apparatus to certain signal frequencies as explained in column 5 of the Oliver patent and this fact is illustrated in FIG. 4 of the Oliver patent which shows regularly repeating "dead spots" in his computer response curve.

Accordingly, while Oliver and the other patents listed above relate to surface measurements, they do not disclose apparatuses equivalent to the present invention.

SUMMARY OF THE INVENTION

An object of the present invention is to provide a rolling digital surface measuring apparatus utilizing a "floating middle wheel" which employs an odometer to trigger a digital computer to record intermittent, regularly spaced readings of a column position in a manner that the entire sequence of wheel contact points remains coordinated.

Another object of the invention is to provide a surface measuring apparatus in accordance with the preceding object in which the measuring apparatus may be propelled across the surface being measured by any mechanical or manual arrangement without there being a requirement that the velocity be constant.

A further object of the invention is to provide a surface measuring apparatus including two support wheels supported on a rigid frame in linear aligned relation and engaging the measured surface with a third sensing wheel being supported in exact equal spaced relation to and aligned with the two supporting wheels in contact with the surface to be measured with the sensing wheel moving a moveable column for movement on an axis normal to a line joining the centers of the two support wheels with an odometer providing an electrical signal directly proportional to the distance traveled by a rear wheel across the surface being measured.

A further object of the invention is to provide an on-board computer including a keyboard, a memory element, a calculation element, and a screen display—which records the position of the moveable column each time the odometer signal is generated, and then computes the elevations of the surface points contacted by the support wheels at each recording position using certain known statistical characteristics of the surface being measured to correct for accumulated errors.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
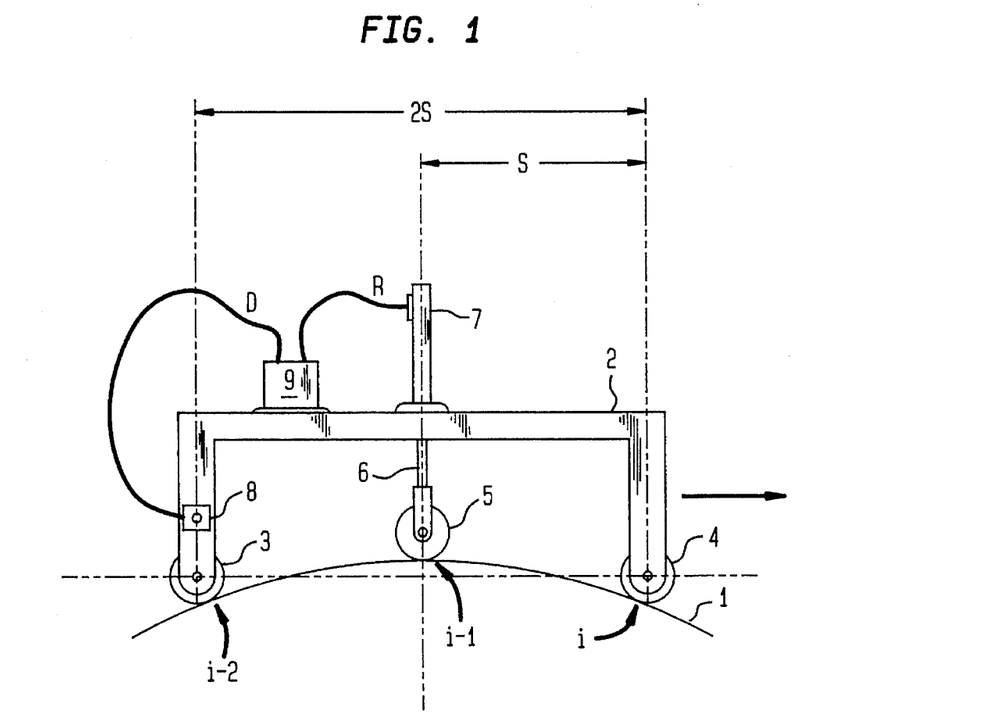
FIG. 1 is a schematic illustration of the rolling digital surface measuring apparatus of the present invention.

The apparatus as schematically illustrated in FIG. 1 includes a rigid frame 2 rotatably supporting a rear wheel 3 and a front wheel 4 that are co-linear and separated by the distance 2S. The two support wheels 3 and 4 contact the measured surface 1 at points i and i-2 respectively and midway between the support wheels 3 and 4 a sensing wheel 5 is in contact with the surface 1 at point i-1. The sensing wheel 5 supports an axially moveable column 6 that is connected to frame 2 in such a manner that its movement relative to frame 2 is restricted to an axis normal to the line joining the centers of the wheels 3 and 4. A linear position transducer 7 having an output signal R is mounted on frame 2 in such a manner that its electrical output is directly proportional to the position of column 6 relative to frame 2. An odometer 8 is mounted on frame 2 to produce an electrical signal D directly proportional to the distance traveled by rear wheel 3 across surface 1. The linear position transducer signal R and odometer signal D are both input to a digital computer 9 which is programmed to interpret the two signals and record the instantaneous position, in convenient dimensions, of the column 6 relative to the frame 2 every time the rear wheel 3 travels the distance S across the surface 1. All of the above named individual components, as well as the electrical powering apparatus required for the apparatus, are commercially available items, and similarly configured surface curvature measurement devices have long been known to those skilled in the art.

In comparing this device with that in Oliver with regard to errors, it is significant that in Oliver, the inevitable compounding noise problem is overcome by changing the Equation 4 coefficients to filter out the noise components of the signal. This can only work on a continuous recording, analog device such as described in the Oliver patent. Because the analog computer in the Oliver patent "sees" the complete continuous output of the floating wheel transducer, Oliver is able to filter out the short wavelength "noise" content of that signal mathematically. In contrast, the column position transducer output signal R of this invention is only sampled intermittently, when the rear wheel 3 traverses the distance S. Thus, information about constituent signal waves shorter than about twice the sampling interval is necessarily lost, thereby making the filtering out of any short wavelength noise impossible. All that the digital computer of this invention "sees" from the column position transducer 7 is a series of rounded finite numbers that approximate the instantaneous amplitude of the column position transducer signal R each time the distance S is traversed by the device. The digital computer in this invention thus remains oblivious to the shape of the transducer signal R between each discrete reading and therefore can not distinguish what portion of the instantaneous signal recorded is associated with any particular wavelength. The intermittent digital character of the data collection and computation process of this invention coupled with the novel way in which the error compounding problem is solved constitute the principal features differentiating the present invention from all previous surface measuring devices.

The compounding of errors is inherent in all double integration devices of this type, and unless corrected for, such error compounding (which increases as the square of the number of readings) will rapidly overwhelm the point elevation calculation. Furthermore, the introduction of significant errors is unavoidable. For example, in addition to operator caused errors, errors arising from deficiencies inherent in the configuration of the device will be contained in each column position reading R. As pointed out by Oliver, the line connecting the support wheel axles will rarely parallel the elevation datum. At each measurement location, the computer of this invention assumes that the rear and front wheels are separated exactly by the distance 2S measured parallel to the elevation datum. However, the actual rear and front wheel separation distance relative to the elevation datum will be given by 2S cosine $\Theta$, where $\Theta$ is the angle between the line connecting rear and front wheel axles and the elevation datum. Likewise, while the computer of this invention assumes that the rear and sensor wheels are separated exactly by the distance S measured parallel to the elevation datum, the actual rear and sensor wheels separation distance relative to the elevation datum will be given by S cos $\phi$ where $\phi$ is the angle between the line connecting rear and sensor wheel axles and the elevation datum.

Each wheel will contact the measured surface at that point where the tangent to the wheel and the tangent to the surface coincide. Due to the undulation of the measured surface, the line connecting the center of each wheel and its associated contact point will rarely be perpendicular to the elevation datum. While the computer of this invention assumes that every reading point will fall on a normal from the wheel center to the elevation datum, in actuality, most of the reading points will be slightly displaced from that assumed position owing to the wheel surface contact geometry.

The computer of this invention records the column position transducer signal R at the instant the odometer 8 indicates that the rear wheel 3 has traveled the distance S. However, between successive reading points, the rear wheel 3 is not traveling in a straight line, but along an undulating surface. Thus, while the computer assumes that the horizontal displacement between successive readings is the constant distance S, in actuality, the straight line distance between each successive reading will vary slightly, according to the length of the undulating surface profile over which the rear wheel travels.

The odometer triggering thus necessarily results in a slightly variable reading point spacing. Accordingly the sensor wheel and front wheel contact points at one reading position will rarely coincide exactly with the rear wheel and sensor wheel contact points at the next reading position.

To be perfectly accurate, each measurement would have to contain an infinity of decimal places. Since the number of digits carried by the computer is finite, there is a rounding error introduced when the decimal infinity of the true measurement distance to the right of the last computer carried digit is dropped. Thus, the computer rounds the last carried digit up or down depending upon the value of the leftmost dropped digit. When the leftmost dropped digit is below 5, the computer rounds down thereby understating the true measurement, and when the leftmost dropped digit is 5 or more, the computer rounds up thereby overstating the true measurement.

In addition to the reading point positioning and rounding problems described above, as a consequence of the physical imperfections inherent in the construction of the device, there will be a fixed characteristic error associated with each one of the finite number of possible column position transducer reading states. And in addition to having a fixed characteristic error component, each column position transducer reading will also contain a completely random noise error.

All of the above error sources insure that each individual column position transducer reading $R_i$ recorded by the computer will be inaccurate by some associated error amount $E_i$. While the range of all possible values to be taken by $E_i$ will be limited by the intrinsic overall accuracy of the measurement system, nevertheless, within that range, the sequence of errors produced by the column position transducer sampling process will fluctuate randomly around some average reading error value $E_{avg}$. The exact error $E_i$ to be associated with any particular reading $R_i$ can not therefore be determined. However, as the number of readings increases, the aggregate effect of all the random unknowable individual errors embodied in those readings begins to stabilize around a certain average value that may be estimated and thus accounted for. It is the unique method by which the present invention overcomes the heretofore insuperable problem of error compounding in an intermittent sampling, digital surface curvature measurement device that constitutes a significant distinguishing feature of the present invention.

Figure 2:
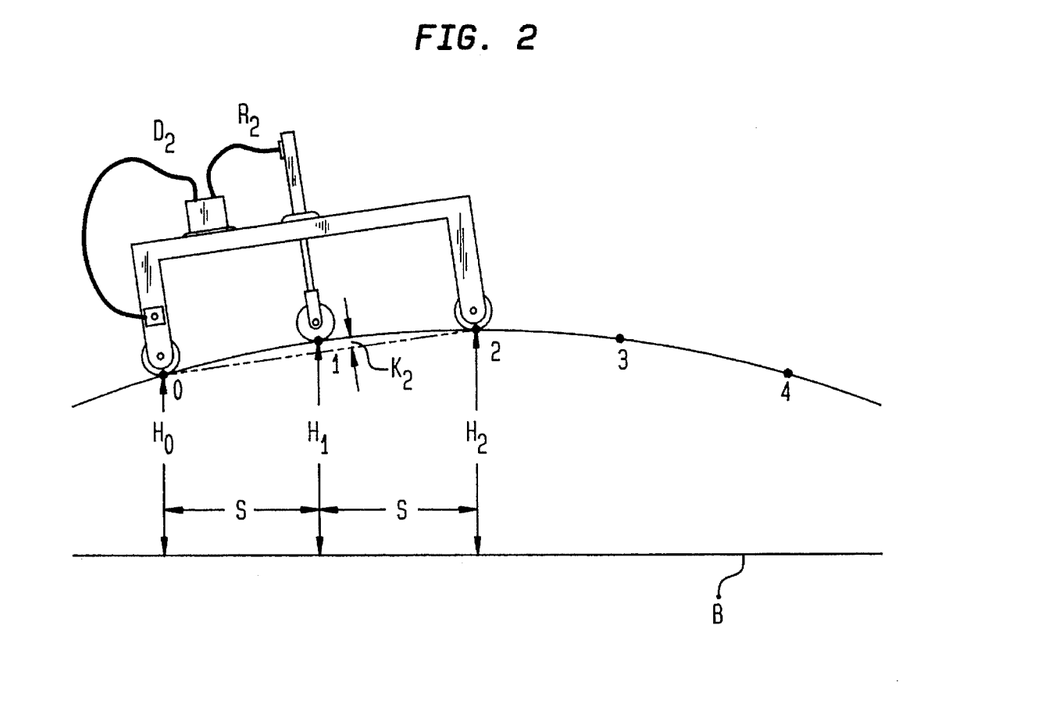
FIGS. 2, 3 and 4 are sequential schematic illustrations of the sequence of the events which occurs when the apparatus in FIG. 1 is moved from left to right as indicated by the arrow in FIG. 1.

As set forth previously, when the device illustrated in FIG. 1 is rolled in a straight line across a surface the following sequence of events occurs:

At the instant the initial column position reading is recorded by the computer, let the rear wheel be at point 0, the sensor wheel be at point 1, and the front wheel be at point 2 as illustrated in FIG. 2. Let any two adjacent points be separated, approximately, by the distance S measured parallel to some arbitrary datum B. Let $H_0$ equal the elevation of point 0, and $H_1$ equal the elevation of point 1 relative to B. Let $K_2$ equal the exact elevation difference between point 1 and the line joining points 0 and 2. Therefore, from the described geometry:

$$H_2 = 2 H_1 - H_0 - 2 K_2 \qquad [1a]$$

Let $R_2$ equal the signal produced by the column position transducer wheel when the front wheel is at point 2 and assume that the transducer is constructed so that its output signal becomes more positive as the distance between the sensor wheel and the frame decreases (that is as the column goes "up"). As discussed above, this scaled signal will inevitably contain some error $E_2$ such that:

$$K_2 = R_2 - E_2 \qquad [1b]$$

Therefore, by substitution:

$$\begin{aligned} H_2 &= 2 H_1 - H_0 - 2 (R_2 - E_2) \qquad [1c] \\ &= 2 H_1 - H_0 - 2 R_2 + 2 E_2 \end{aligned}$$

Figure 3:
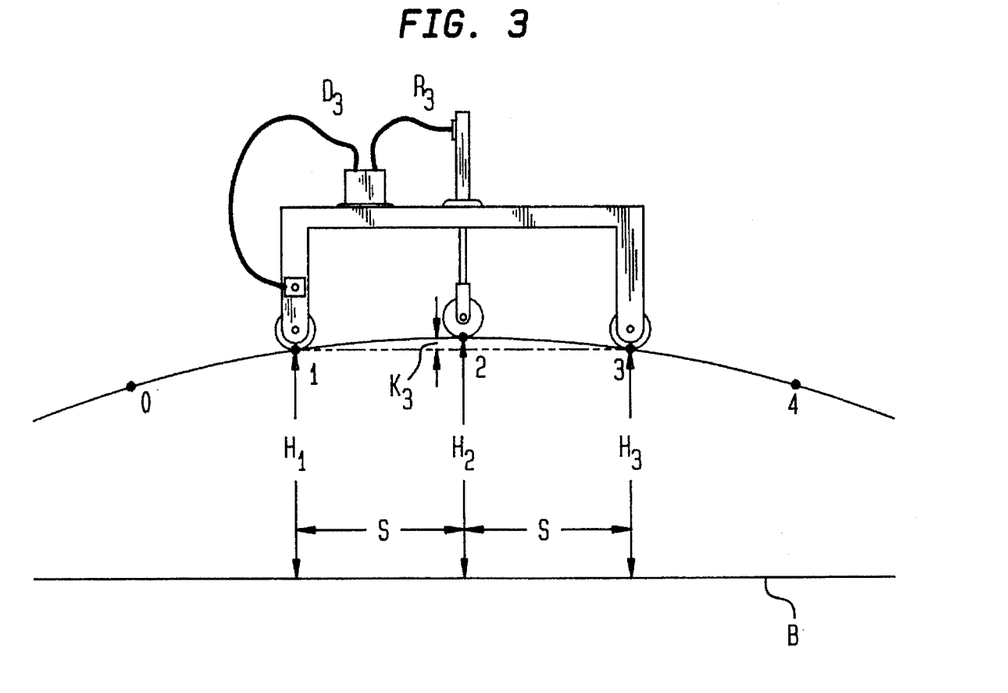

Let the device now advance across the surface the distance S to the second reading location (FIG. 3). The rear wheel is now approximately at point 1, the sensor wheel is now approximately at point 2 and the front wheel is now at point 3. Let $K_3$ equal the exact elevation difference between point 2 and the line joining points 1 and 3. Therefore, from the described geometry:

$$\begin{aligned} H_3 &= 2 H_2 - H_1 - 2 K_3 \qquad [2a] \\ &= 2 (2 H_1 - H_0 - 2 R_2 + 2 E_2) - H_1 - 2 K_3 \\ &= 3 H_1 - 2 H_0 - 4 R_2 + 4 E_2 - 2 K_3 \end{aligned}$$

Let $R_3$ equal the scaled signal produced by the column position transducer when the front wheel is at point 3. This scaled signal will contain an error $E_3$ such that:

$$K_3 = R_3 - E_3 \qquad [2b]$$

Therefore by substitution:

$$\begin{aligned} H_3 &= 3 H_1 - 2 H_0 - 4 R_2 + 4 E_2 - 2 (R_3 - E_3) \qquad [2c] \\ &= 3 H_1 - 2 H_0 - 4 R_2 - 2 R_3 + 4 E_2 + 2 E_3 \end{aligned}$$

Figure 4:
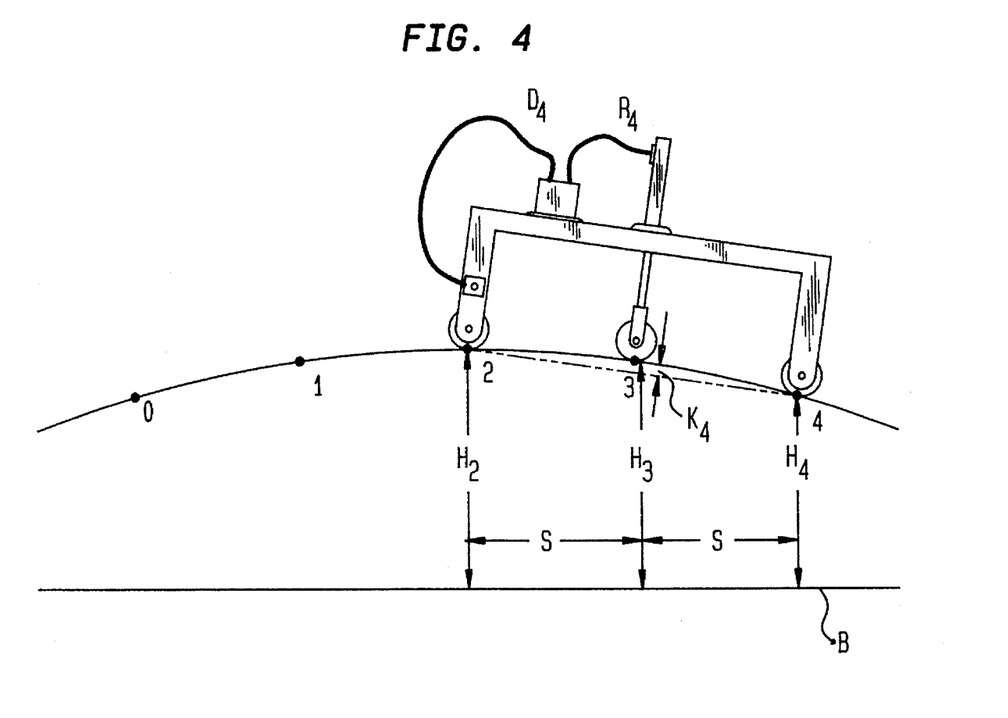
Figure 5:
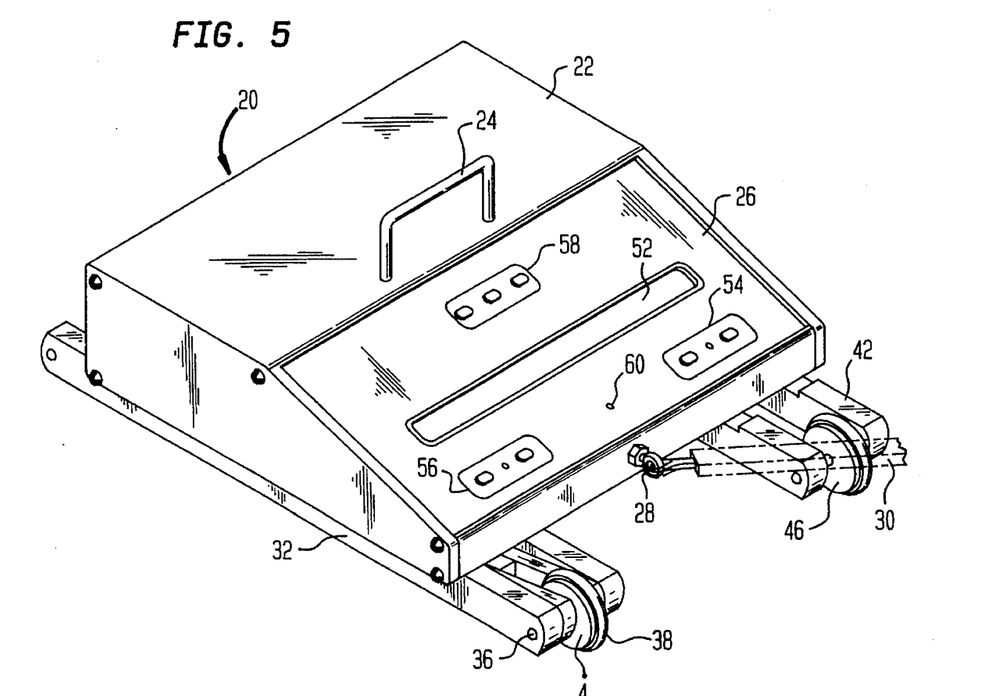
FIG. 5 is a perspective view of a functioning apparatus in accordance with the present invention.

Now let the device again advance across the surface the distance S to the third reading location (FIG. 4). The rear wheel is now approximately at point 2, the sensor wheel is now approximately at point 3 and the front wheel is now at point 4. Let $K_4$ equal the exact elevation difference between point 3 and the line joining points 2 and 4. Therefore, from the geometry described:

$$\begin{aligned} H_4 &= 2 H_3 - H_2 - 2 K_4 \qquad [3a] \\ &= 2 (3 H_1 - 2 H_0 - 4 R_2 - 2 R_3 + 4 E_2 + 2 E_3) - \\ &\quad (2 H_1 - H_0 + 2 R_2 - 2 E_2) - 2 K_4 \\ &= 4 H_1 - 3 H_0 - 6 R_2 - 4 R_3 + 6 E_2 + 4 E_3 - 2 K_4 \end{aligned}$$

Let $R_4$ equal the scaled signal produced by the column position transducer. This scaled signal will contain an error $E_4$ such that:

$$K_4 = R_4 - E_4 \qquad [3b]$$

Therefore, by substitution:

$$\begin{aligned} H_4 &= 4 H_1 - 3 H_0 - 6 R_2 - 4 R_3 + 6 E_2 + 4 E_3 - 2 K_4 - \qquad [3c] \\ &\quad 2 (R_4 - E_4) \\ &= 4 H_1 - 3 H_0 - 6 R_2 - 4 R_3 - 2 R_4 + 6 E_2 + 4 E_3 + \\ &\quad 2 E_4 \end{aligned}$$

From the above, it is apparent that by making the appropriate substitutions, a general expression may be obtained for the elevation of any subsequent front wheel reading point "j". This general expression will involve only $H_1$, $H_0$, a combination of all previous and current column position transducer readings, and a combination of all previous and current reading errors:

$$H_j = jH_1 - (j-1)H_0 - 2 \sum_{i=2}^{j} (j+1-i)R_i + 2 \sum_{i=2}^{j} (j+1-i)E_i \qquad [4a]$$

$(j > 1)$

As the sequence of readings is collected, the index of the final measurement point N (which equals the total point count) and the successive values of $R_i$ are the only values on the right side of the above equation which are recorded by the computer. Therefore, after the data collection run has been completed, in order to solve Equation 4a for each individual measurement point elevation $H_i$ in the sequence, additional expressions must be obtained for both the combination of error terms and the elevations $H_1$ and $H_0$.

In the discussion on errors given above, it is noted that while each individual reading error would be random and unknowable, the reading errors as a group would nonetheless necessarily vary within finite limits around some average error value, $E_{avg}$. In fact, it can be shown that as the number of readings increases, the following approximation becomes more and more accurate:

$$\text{If } E_{avg} = \sum_{i=2}^{N} E_i/(N-1), \text{ where } N = \text{index of final point} \qquad [5a]$$

then as $N \to \infty$, $$N(N-1)E_{avg} \to 2 \sum_{i=2}^{N} (N+1-i)E_i \text{ as } N \to \infty \; (N > 1)$$

Similarly, the actual profile curvature dimensions $K_i$ defined above also follow the same rule. Since the curvatures on a given surface will vary within some finite range around some average value, the following approximation also becomes more accurate as the number of measurement points increases:

If $K_{avg} = \sum_{i=2}^{N} K_i/(N-1)$, where $N$ = index of final point, [5b]

then as $N \to \infty$, $$N(N-1)K_{avg} \to 2 \sum_{i=2}^{N} (N+1-i)K_i \text{ as } N \to \infty \, (N > 1)$$

Now by definition $K_i=(R_i-E_i)$. Substituting this expression for $K_i$ into approximation 5b for $K_{avg}$ (and separating terms) yields:

$$N(N-1) K_{avg} \approx 2(N-1) R_2 + 2(N-2) R_3 + \quad [5c]$$

$$2(N-3) R_4 + \ldots + 6 R_{N-2} + N(N-1)K_{avg} \approx$$

$$2 \sum_{i=2}^{N} (N+1-i)R_i - 2 \sum_{i=2}^{N} (N+1-i)E_i \, (N > 1)$$

Now replacing the combination of error terms in Approximation 5c with $N(N-1) E_{avg}$ (as permitted by Approximation 5a) yields:

$$N(N-1)K_{avg} \approx 2 \sum_{i=2}^{N} (N+1-i)R_i - N(N-1)E_{avg} \, (N > 1) \quad [5d]$$

Finally, by rearranging this expression, an approximation for $E_{avg}$ is obtained in terms of the combination of all reading terms $R_i$ and $K_{avg}$:

$$E_{avg} \approx \frac{2}{N(N-1)} \sum_{i=2}^{N} (N+1-i)R_i - K_{avg} \, (N > 1) \quad [5e]$$

Now $K_i$ is just one member of a general category of incremental curvatures $Q_{i_j}$ having the form:

$$Q_{i_j} = H_{i-j} - (H_{i-2j} + H_i)/2 \quad [5f]$$

where $j$ is the particular point spacing multiple employed. It is well established that on most real surfaces (including pavements and floors), all incremental curvature measurements, regardless of their point spacing, share the following characteristic:

If $Q_{avg_j} = \sum_{i=2j}^{N} Q_{i_j}/(N-1)$, where $N$ = index of final point, [5g]

then as $N \to \infty$, $Q_{avg_j} \to 0$.

In other words, regardless of the point spacing multiple selected, as the number of measurements increases, the various individual positive and negative incremental curvature values characteristically tend to cancel one another out, thereby resulting in an average incremental curvature value of zero over the entire surface.
Therefore, since the measured curvature $$K_i = Q_{i_1} \text{ and } K_{avg} = Q_{avg_1}, \text{ then } K_{avg} \to 0 \text{ as } N \to \infty. \quad [5h]$$

By assuming, in fact, that $K_{avg}=0$, Approximation 5e for $E_{avg}$ is reduced to a function solely of the entire collection of transducer readings recorded during the run:

$$E_{avg} \approx \frac{2}{N(N-1)} \sum_{i=2}^{N} (N+1-i)R_i \, (N > 1) \quad [5i]$$

where: N=index of final measurement point.

Thus, using Approximation 5i, $E_{avg}$ may be determined as soon as the final column position transducer reading is recorded.

The logic embodied in Approximation 5a also permits the summation of error terms in Equation 4a to be replaced by $j(j-1) E_{avg}$, where $E_{avg}$ is determined using Approximation 5i:

$$H_j \approx jH_1 - (j-1)H_0 - 2 \sum_{i=2}^{j} (j+1-i)R_i + j(j-1)E_{avg} \quad [6a]$$
$$(1 < j \leq N)$$

Finally, by using Approximation 5i for $E_{avg}$ in approximation 6a, an expression can be obtained for $H_j$ solely in terms of $H_0$, $H_1$, and a summation of the recorded readings $$H_j \approx jH_1 - (j-1)H_0 - 2 \sum_{i=2}^{j} (j+1-i)R_i + \quad [6b]$$

$$2 \frac{j(j-1)}{N(N-1)} \sum_{i=2}^{N} (N+1-i)R_i \, (1 < j \leq N);$$

Originally, both the elevation and orientation of datum line B were arbitrarily established, and the $H_0$ and $H_1$ terms which appear in Approximation 6b reflect that generalization. Thus, by assigning specific values to $H_0$ and $H_1$, datum line B may be positioned and oriented in any manner desired. In practice, to simplify calculations, datum line B is usually made to pass through the initial measurement point 0. This is accomplished simply by assigning the value 0 to $H_0$:

$$H_0 = 0 \quad [7a]$$

This arbitrary positioning of the datum line through point 0 permits $H_j$ in Approximation 6b to be reduced solely to a function of $H_1$ and the recorded readings $$H_j \approx jH_1 - 2 \sum_{i=2}^{j} (j+1-i)R_i + 2 \frac{j(j-1)}{N(N-1)} \sum_{i=2}^{N} (N+1-i)R_i \quad [7b]$$

$$(1 < j \leq N)$$

With the $H_0$ term so eliminated, it remains only to fix the value $H_1$ to establish the datum line's precise orientation. In practice, the value $H_1$ is usually determined in one of three ways:

Method 1: Horizontal Datum Line Through Initial Point 0

When it is desired to relate the point elevations to a horizontal datum passing through point 0, the elevation difference $H_j$ (relative to horizontal) between any particular point j in the sequence and starting point 0 is measured using any convenient ancillary surveying means (e.g., by using a level or inclinometer). Since Approximation 7b references all subsequent measurement point elevations to point 0, establishing the elevation $H_j$ of any subsequent point j relative to the horizontal datum passing through point 0 fixes the elevations of all other calculated points relative to that datum.

With one value for $H_j$ (j>1) independently established relative to point 0, Approximation 7b can be arranged to solve for $H_1$:

$$H_1 \approx \frac{H_j}{j} - \frac{2}{j} \sum_{i=2}^{j} (j+1-i)R_i + \quad [8]$$

$$2 \frac{j(j-1)}{N(N-1)} \sum_{i=2}^{N} (N+1-i)R_i \, (1 < j \leq N)$$

This value for $H_1$ is then used in Approximation 7b in conjunction with the sequence of recorded readings to compute the elevations of all subsequent measurement points.

Method 2: Horizontal Datum Line Through Initial Point 0

Alternatively, the calculation of $H_1$ using Approximation 8 can be avoided simply by measuring $H_1$ itself relative to the horizontal datum passing through point 0. In this case, the independently measured $H_1$ value is substituted directly into Approximation 7b to compute all subsequent point elevations.

The individual steps required to obtain the desired sequence of regularly spaced, co-linear surface point elevations relative to a level datum passing through the initial point 0 may thus be summarized as follows:

1. Position the device on the surface to be tested in such manner that its rear wheel is made to coincide with the desired initial measurement point 0 at the instant the odometer triggers the computer to record the initial column position transducer reading $R_2$.
2. Roll the device across the surface along the straight line connecting the desired initial and final measurement points. As the unit moves each additional distance S across the surface, the computer, triggered by the odometer, records the column position transducer output $R_i$ to be associated with the point "i" being contacted by the front wheel at the instant of $R_i$'s recording.
3. Stop the device as soon as its front wheel passes the desired final measurement point N. The computer now contains an ordered record of the entire sequence of column position transducer readings $R_i$ collected between the starting and stopping positions.
4. Let $H_0=0$.
5. Using some other surveying means, measure the elevation $H_j$ of any measurement point j relative to the horizontal datum passing through initial point 0. If j=1, go to step 7.
6. Using Approximation 8 and the values for j and $H_j$ obtained in Step 5, compute $H_1$.
7. Using Approximation 7b, for measurement points 2 through N, calculate the sequence of point elevations $H_i$ using the column position transducer readings obtained in Steps 1 and 2 and the value for $H_1$ obtained in Step 5 (if auxiliary measure point j=1) or Step 6 (if auxiliary measure point j>1).

Method 3: Datum Line Through Initial Point 0 and Final Point N

When it is not necessary to reference the point elevations to a horizontal datum, the datum line established through initial point 0 by equation 7a can be conveniently oriented to pass through the final reading point N simply by setting $H_N$ equal to zero:

$$H_N = 0 \quad [9a]$$

By virtue of Approximation 7b, if j=N and $H_N=0$, then $$H_1 = 0 \quad [9b]$$

and Approximation 7b simplifies to:

$$H_j = -2 \sum_{i=2}^{j} (j+1-i)R_i + 2 \frac{j(j-1)}{N(N-1)} \sum_{i=2}^{N} (N+1-i)R_i \quad [9c]$$

$(1 < j < N)$

Now Approximation 9b is obviously unrealistic since the measurement points 0, 1 and N will seldom perfectly align on the datum line. However, this inaccuracy is the cost incurred in using Approximation 5a to estimate the collection of actual reading errors.

The individual steps required to obtain the desired sequence of regularly spaced, co-linear surface point elevations relative to a datum passing through the initial point 0 and the final point N may thus be summarized as follows:

1. Position the device on the surface to be tested in such manner that its rear wheel is made to coincide with the desired initial measurement point 0 at the instant the odometer triggers the computer to record the initial column position transducer reading $R_2$.
2. Roll the device across the surface along the straight line connecting the desired initial and final measurement points. As the unit moves each additional distance S across the surface, the computer, triggered by the odometer, records the column position transducer output $R_i$ to be associated with the point "i" being contacted by the front wheel at the instant $R_i$s recording.
3. Stop the device as soon as its front wheel passes the desired final measurement point N. The computer now contains an ordered record of the entire sequence of column position transducer readings collected between the starting and stopping positions.
4. Let $H_0=H_1=H_N=0$.
5. Using Approximation 9c, for measurement point 2 through N-1, calculate the sequence of point elevations $H_i$ using the column position transducer readings obtained in Steps 1 and 2.

FIGS. 5–8 disclose a working embodiment of the invention that is generally designated by reference numeral 20 and includes a housing or casing 22 provided with a handle 24 thereon which may be rigid therewith or pivotal and located generally at the center of weight distribution of the apparatus to lift and handle the device. The forward end of the housing 22 is downwardly inclined at 26 and the forward edge includes an eye bolt 28 or the like to which a towing strap or line 30 may be attached by which the apparatus 20 may be towed manually or by any other suitable means.

Figure 6:
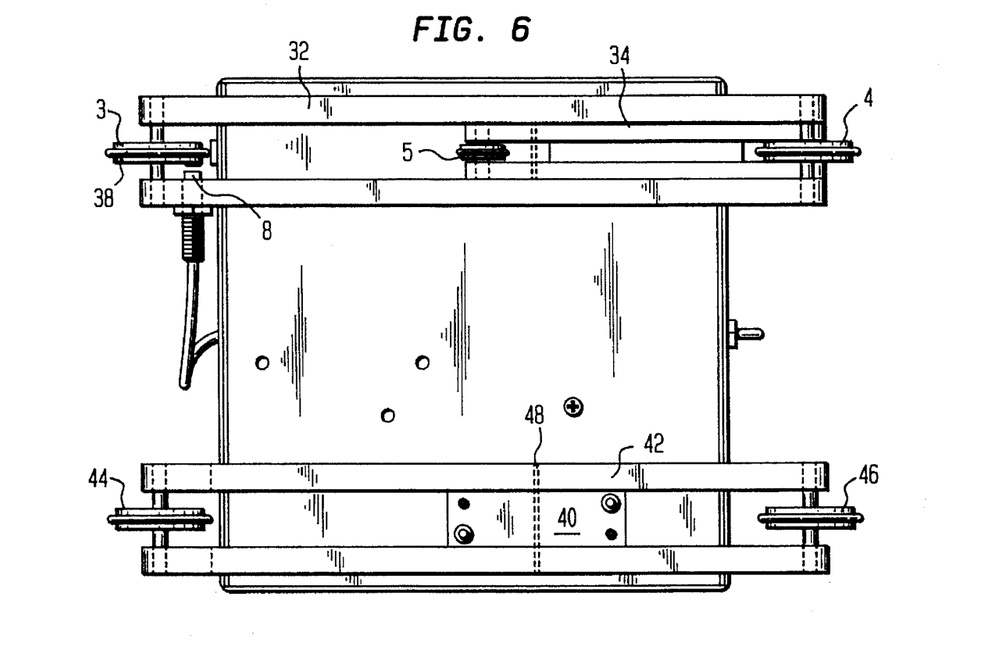
FIG. 6 is a bottom plan view of the apparatus illustrating the construction of the supporting wheel arrangement and floating wheel.
Figure 7:
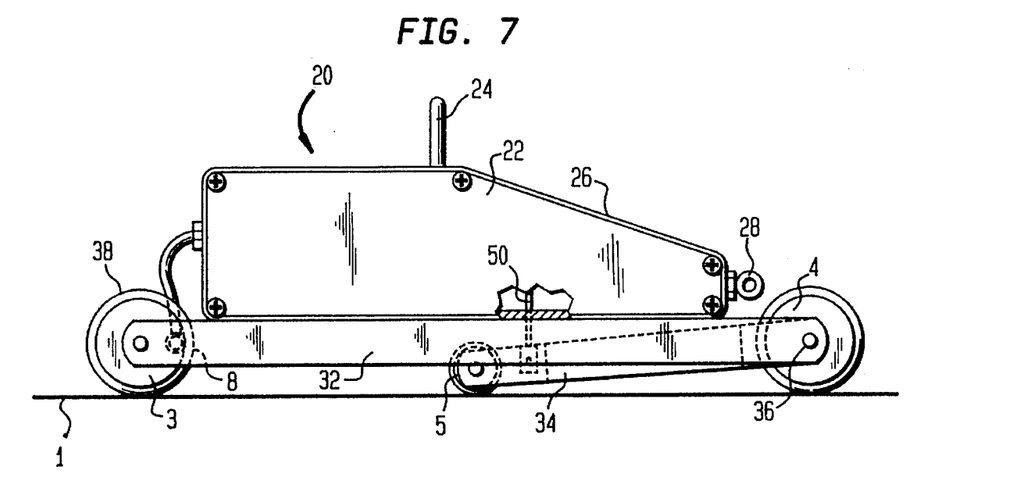
FIG. 7 is a side elevational view of the apparatus illustrating the relationship of the wheels and frame.
Figure 8:
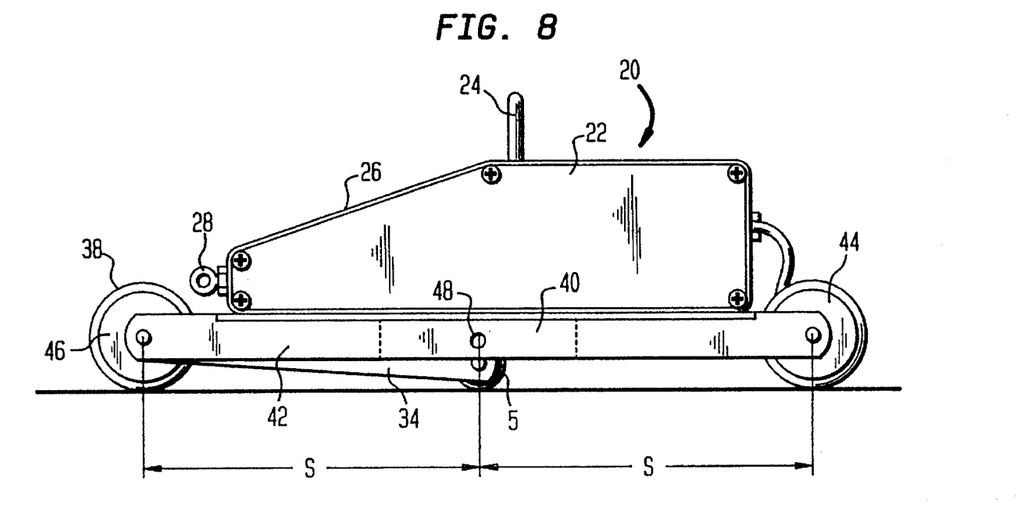
FIG. 8 is a side elevational view of the apparatus opposite to that in FIG. 7.

As illustrated in FIG. 6, the casing or housing 22 forms a part of the frame which includes frame rails 32 rigidly secured to the undersurface of the housing with the wheels 3, 4 and 5 supported therefrom with the wheel 3 associated with the odometer 8 and the wheel 5 being the floating wheel mounted on a trailing arm support 34 pivotal from the axle 36 for the front wheel 4. Each of the wheels includes a peripheral resilient tire or band 38 thereon for nonslip engagement with the surface 1 being measured. The opposite side of the housing is supported from a bracket 40 and includes a pivotal bogey support frame 42 having wheels 44 and 46 journaled therefrom which are in alignment with each other and in transverse alignment with the wheels 3 and 4 thus providing a four wheel, stable support. Since the bogey frame 42 is pivotal at its center to the bracket 40 by pivot axle 48, in effect, a three point supporting structure is provided for the apparatus with the floating wheel 5 including a connection with a vertical member 50 which corresponds to the column 6 associated with the transducer 7. The relationship of the points of contacts of the co-linear wheels 3, 4 and 5 is exactly the same as in FIGS. 1–4 and the function of the wheels, odometer and vertically moveable column 50 being the same as described in connection with FIGS. 1–4. The inclined forward top portion of the housing is provided with a window 52 to enable observation of the digital results of the apparatus and also includes power source controls 54, recording controls for the information provided by the apparatus and instructional controls 58 as well as an indicator 60 to indicate operation of the apparatus. The rolling digital surface measuring apparatus 20 thus is capable of measuring and recording the elevations of a plurality of regularly spaced, sequentially ordered, co-linear points relative to a datum referenced to any two points in the sequence by utilizing the surface being measured, the engagement of the floating wheel therewith, and the specific relationship of the rear wheel 3 and odometer 8 so that the rear wheel, when it turns one revolution will be at approximately the same point as the point on the surface which was previously engaged by the floating wheel 5 thereby coordinating the points of measurement with the distance traversed.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A surface measuring apparatus comprising:

a frame, a plurality of wheels supported on said frame in rolling contact with a surface to be measured, said plurality of wheels including a pair of longitudinally aligned wheels mounted on said frame in predetermined spaced relation, said plurality of wheels further including a floating wheel mounted on said frame midway between said pair of longitudinally aligned wheels and in contact with the surface to be measured with said floating wheel being capable of movement toward and away from said frame, a linear position transducer connected to said floating wheel to produce a signal corresponding to the movement of said floating wheel toward and away from said frame, an odometer mounted on said frame and connected to one of said pair of longitudinally aligned wheels for outputting a signal D directly proportional to a distance traveled by said one of said pair of longitudinally aligned wheels on the surface to be measured, a computer to receive said signal D from said odometer to trigger said computer to record intermittent regularly spaced readings of said linear position transducer every time said one of said pair of longitudinally aligned wheels travels a distance S between the center of said one of said pair of longitudinally aligned wheels and the center of said floating wheel, the following equations defining the relationship between point elevations on the surface to be measured which are designated by $H_0$, $H_1$ and $H_j$, where j is the index of the measurement point currently under consideration, $R_i$ is the reading of said linear position transducer associated with a point i, and N is the index of the final measurement point:

$$H_0 = 0$$

and $$H_j = jH_1 - 2 \sum_{i=2}^{j} (j+1-i)R_i + 2 \frac{j(j+1)}{N(N-1)} \sum_{i=2}^{N} (N+1-i)R_i$$

2. The surface measuring apparatus as defined in claim 1 wherein said pair of longitudinally aligned wheels and said floating wheel are mounted along one side edge portion of said frame, and further comprising a housing mounted on said frame for receiving said computer, and wheel means mounted in laterally spaced relation to said pair of longitudinally aligned wheels to provide a stable support for the apparatus.

3. The surface measuring apparatus as defined in claim 2 wherein said wheel means includes a pair of longitudinally spaced and aligned front and rear bogey wheels, a longitudinally extending support beam having said bogey wheels rotatably journalled adjacent the outer ends of said support beam, pivot means pivotally supporting the central portion of said support beam to said frame for pivotal movement of said support beam about a transverse axis parallel to the rotational axis of said bogey wheels, said pivot means mounted along one side edge portion of said frame, said bogey wheels being spaced equally from said pivot means and in transverse alignment with and being rotatable about an axis parallel to the axis of rotation of said bogey wheels mounted along one side edge portion of said frame to facilitate towing of the apparatus in a straight line path and facilitating turn around of the apparatus by lifting the forward end of the apparatus off the surface to be measured and turning the apparatus while supported by said one of said pair of longitudinally aligned wheels and said rear bogey wheel at the rear of the apparatus.

* * * * *